(12) United States Patent
Sanders et al.

(10) Patent No.: US 8,393,180 B1
(45) Date of Patent: Mar. 12, 2013

(54) METHOD OF MANUFACTURING A FIBERGLASS MAT

(75) Inventors: Lewis Sanders, Fayetteville, AR (US); Christopher Erbe, Farmington, AR (US)

(73) Assignee: AAF-McQuay Inc., Louisville, KY (US)

( * ) Notice: Subject to any disclaimer, the term of this patent is extended or adjusted under 35 U.S.C. 154(b) by 375 days.

(21) Appl. No.: 12/634,320

(22) Filed: Dec. 9, 2009

Related U.S. Application Data

(60) Provisional application No. 61/233,116, filed on Aug. 11, 2009.

(51) Int. Cl.
C03B 37/12 (2006.01)

(52) U.S. Cl. ............................................ 65/479; 65/381

(58) Field of Classification Search ............... 65/479, 65/486, 505, 534, 535, 539
See application file for complete search history.

(56) References Cited

U.S. PATENT DOCUMENTS

| | | | |
|---|---|---|---|
| 2,546,230 A | 3/1951 | Modigliani | |
| 2,609,320 A | 9/1952 | Modigliani | |
| 2,644,780 A | 7/1953 | Simkins et al. | |
| 2,798,531 A | 7/1957 | Jackson, Jr. | |
| 2,964,439 A | 12/1960 | Modigliani | |
| 2,984,286 A | 5/1961 | Copenhefer | |
| 3,051,602 A | 8/1962 | Schairbaum | |
| 3,072,513 A | 1/1963 | Schlarb | |
| 3,092,533 A | 6/1963 | Beckner | |
| 3,303,010 A | 2/1967 | Copenhefer | |
| 3,314,840 A | 4/1967 | Lloyd et al. | |
| 3,322,585 A | 5/1967 | Weber et al. | |
| 3,338,992 A | 8/1967 | Kinney | |
| 3,441,468 A | 4/1969 | Siggel et al. | |
| 3,459,627 A | 8/1969 | Vosburgh, Sr. | |
| 3,476,635 A | 11/1969 | Heh | |
| 3,506,420 A | 4/1970 | Jackson, Jr. et al. | |
| 3,526,557 A | 9/1970 | Taylor, Jr. | |
| 3,540,870 A * | 11/1970 | Ching | 65/529 |
| 3,553,045 A | 1/1971 | Heh | |
| 3,689,342 A | 9/1972 | Vogt et al. | |
| 3,752,613 A | 8/1973 | Vogt et al. | |
| 3,833,438 A | 9/1974 | Kaneko et al. | |
| 4,212,915 A | 7/1980 | Vollbrecht et al. | |
| 4,220,496 A | 9/1980 | Carley et al. | |
| 4,628,571 A | 12/1986 | Marx et al. | |
| 5,639,411 A | 6/1997 | Wilkins et al. | |
| 5,908,596 A | 6/1999 | Wilkins et al. | |
| 6,663,805 B1 | 12/2003 | Ekiner et al. | |
| 7,276,166 B2 | 10/2007 | Koslow | |
| 7,300,515 B2 | 11/2007 | Porter | |
| 2005/0026527 A1 | 2/2005 | Schmidt et al. | |
| 2007/0049143 A1 | 3/2007 | D'Silva et al. | |
| 2007/0072504 A1 | 3/2007 | McCarthy | |
| 2007/0173155 A1 | 7/2007 | Shoemake et al. | |
| 2007/0202762 A1 | 8/2007 | Hirawaki et al. | |

* cited by examiner

*Primary Examiner* — Jason L Lazorcik
*Assistant Examiner* — Erin Snelting
(74) *Attorney, Agent, or Firm* — John F. Salazar; Middleton Reutlinger

(57) ABSTRACT

In the description and drawings a method of forming a fiberglass mat is disclosed. A drum is rotated, a molten fiberglass material is fed through at least one orifice of a furnace while rotating the drum, and the relative position of the orifice with respect to a location on the drum is altered while rotating the drum and feeding the molten fiber glass material through the orifice to build up a fiberglass matt along a traverse length.

18 Claims, 11 Drawing Sheets

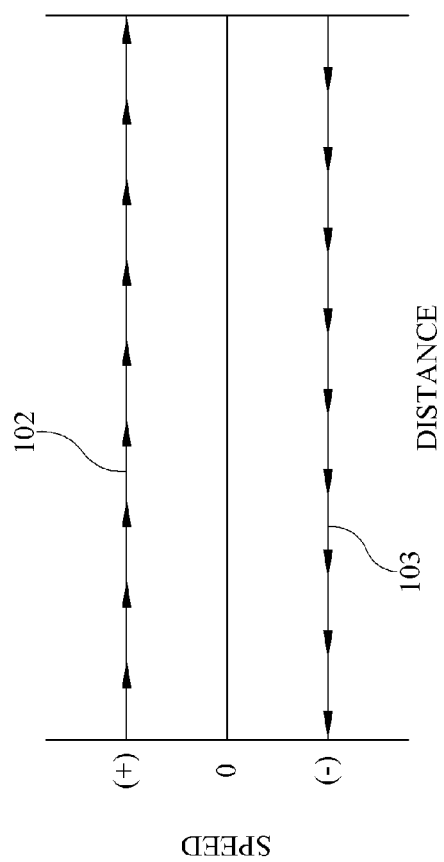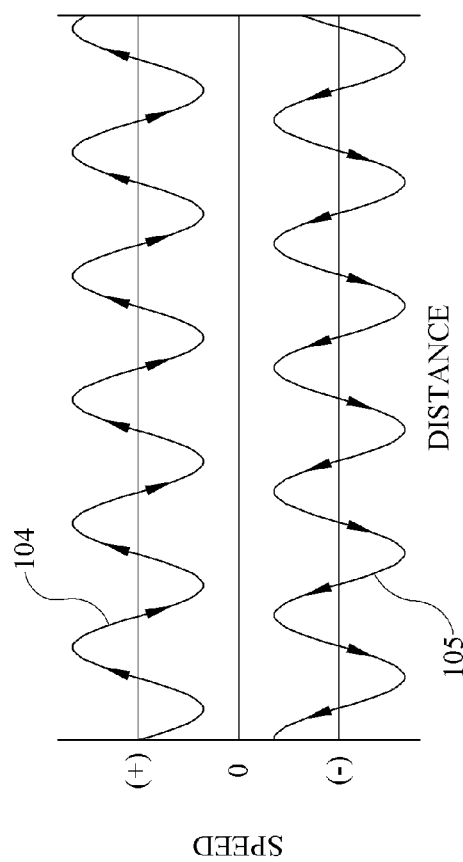

| | Line 181 | | | Line 181 Continued | | | Line 182 | | | Line 182 Continued | |
|---|---|---|---|---|---|---|---|---|---|---|---|
| Ref. | Inches from 1st Traverse Pt. | Fiber Angle | Ref. | Inches from 1st Traverse Pt. | Fiber Angle | Ref. | Inches from 1st Traverse Pt. | Fiber Angle | Ref. | Inches from 1st Traverse Pt. | Fiber Angle |
| 191 | 23.5306 | -0.645 | | 16.0694 | -0.645 | | 8.6583 | 0.000 | | 15.8583 | 0.154 |
| | 23.3111 | -0.645 | | 15.8500 | -0.645 | | 8.8583 | 0.004 | | 16.0583 | 0.154 |
| | 23.0917 | -0.645 | | 15.6306 | -0.645 | | 9.0583 | 0.007 | | 16.2583 | 0.154 |
| | 22.8722 | -0.645 | | 15.4111 | -0.645 | | 9.2583 | 0.012 | | 16.4583 | 0.153 |
| | 22.6528 | -0.645 | | 15.1917 | -0.645 | | 9.4583 | 0.016 | | 16.6583 | 0.151 |
| | 22.4333 | -0.645 | | 14.9722 | -0.645 | | 9.6583 | 0.021 | | 16.8583 | 0.150 |
| | 22.2139 | -0.645 | | 14.7528 | -0.645 | | 9.8583 | 0.026 | | 17.0583 | 0.147 |
| | 21.9944 | -0.645 | | 14.5333 | -0.645 | | 10.0583 | 0.031 | | 17.2583 | 0.145 |
| | 21.7750 | -0.645 | | 14.3139 | -0.645 | | 10.2583 | 0.036 | | 17.4583 | 0.142 |
| | 21.5556 | -0.645 | | 14.0944 | -0.645 | | 10.4583 | 0.042 | | 17.6583 | 0.139 |
| | 21.3361 | -0.645 | | 13.8750 | -0.645 | | 10.6583 | 0.047 | | 17.8583 | 0.135 |
| | 21.1167 | -0.645 | | 13.6556 | -0.645 | | 10.8583 | 0.053 | | 18.0583 | 0.131 |
| | 20.8972 | -0.645 | | 13.4361 | -0.645 | | 11.0583 | 0.059 | | 18.2583 | 0.127 |
| | 20.6778 | -0.645 | | 13.2167 | -0.645 | | 11.2583 | 0.065 | | 18.4583 | 0.123 |
| | 20.4583 | -0.645 | | 12.9972 | -0.645 | | 11.4583 | 0.071 | | 18.6583 | 0.118 |
| | 20.2389 | -0.645 | | 12.7778 | -0.645 | | 11.6583 | 0.077 | | 18.8583 | 0.113 |
| | 20.0194 | -0.645 | | 12.5583 | -0.645 | | 11.8583 | 0.083 | | 19.0583 | 0.108 |
| | 19.8000 | -0.645 | | 12.3389 | -0.645 | | 12.0583 | 0.088 | | 19.2583 | 0.103 |
| | 19.5806 | -0.645 | | 12.1194 | -0.645 | | 12.2583 | 0.094 | | 19.4583 | 0.097 |
| | 19.3611 | -0.645 | | 11.9000 | -0.645 | | 12.4583 | 0.100 | | 19.6583 | 0.091 |
| | 19.1417 | -0.645 | | 11.6806 | -0.645 | | 12.6583 | 0.105 | | 19.8583 | 0.086 |
| | 18.9222 | -0.645 | | 11.4611 | -0.645 | | 12.8583 | 0.110 | | 20.0583 | 0.080 |
| | 18.7028 | -0.645 | | 11.2417 | -0.645 | | 13.0583 | 0.116 | | 20.2583 | 0.074 |
| | 18.4833 | -0.645 | | 11.0222 | -0.645 | | 13.2583 | 0.120 | | 20.4583 | 0.068 |
| | 18.2639 | -0.645 | | 10.8028 | -0.645 | | 13.4583 | 0.125 | | 20.6583 | 0.062 |
| | 18.0444 | -0.645 | | 10.5833 | -0.645 | | 13.6583 | 0.129 | | 20.8583 | 0.056 |
| | 17.8250 | -0.645 | | 10.3639 | -0.645 | | 13.8583 | 0.133 | | 21.0583 | 0.050 |
| | 17.6056 | -0.645 | | 10.1444 | -0.645 | | 14.0583 | 0.137 | | 21.2583 | 0.045 |
| | 17.3861 | -0.645 | | 9.9250 | -0.645 | | 14.2583 | 0.140 | | 21.4583 | 0.039 |
| | 17.1667 | -0.645 | | 9.7056 | -0.645 | | 14.4583 | 0.144 | | 21.6583 | 0.034 |
| | 16.9472 | -0.645 | | 9.4861 | -0.645 | | 14.6583 | 0.146 | | 21.8583 | 0.028 |
| | 16.7278 | -0.645 | | 9.2667 | -0.645 | | 14.8583 | 0.149 | | 22.0583 | 0.023 |
| | 16.5083 | -0.645 | | 9.0472 | -0.645 | | 15.0583 | 0.150 | | 22.2583 | 0.018 |
| | 16.2889 | -0.645 | | 8.8278 | -0.645 | | 15.2583 | 0.152 | | 22.4583 | 0.014 |
| | | | 192 | 8.6083 | -0.645 | | 15.4583 | 0.153 | | 22.6583 | 0.009 |
| | | | | | | | 15.6583 | 0.154 | 193 | 22.8583 | 0.005 |
| | | | | | | | | | | 23.0583 | 0.002 |

FIG. 6A-1

| | Line 183 | | | Line 183 Continued | |
|---|---|---|---|---|---|
| Ref. | Inches from 1st Traverse Pt. | Fiber Angle | Ref. | Inches from 1st Traverse Pt. | Fiber Angle |
| | 22.9389 | -0.645 | | 15.4778 | -0.645 |
| | 22.7194 | -0.645 | | 15.2583 | -0.645 |
| | 22.5000 | -0.645 | | 15.0389 | -0.645 |
| | 22.2806 | -0.645 | | 14.8194 | -0.645 |
| | 22.0611 | -0.645 | | 14.6000 | -0.645 |
| | 21.8417 | -0.645 | | 14.3806 | -0.645 |
| | 21.6222 | -0.645 | | 14.1611 | -0.645 |
| | 21.4028 | -0.645 | | 13.9417 | -0.645 |
| | 21.1833 | -0.645 | | 13.7222 | -0.645 |
| | 20.9639 | -0.645 | | 13.5028 | -0.645 |
| | 20.7444 | -0.645 | | 13.2833 | -0.645 |
| | 20.5250 | -0.645 | | 13.0639 | -0.645 |
| | 20.3056 | -0.645 | | 12.8444 | -0.645 |
| | 20.0861 | -0.645 | | 12.6250 | -0.645 |
| | 19.8667 | -0.645 | | 12.4056 | -0.645 |
| | 19.6472 | -0.645 | | 12.1861 | -0.645 |
| | 19.4278 | -0.645 | | 11.9667 | -0.645 |
| | 19.2083 | -0.645 | | 11.7472 | -0.645 |
| | 18.9889 | -0.645 | | 11.5278 | -0.645 |
| | 18.7694 | -0.645 | | 11.3083 | -0.645 |
| | 18.5500 | -0.645 | | 11.0889 | -0.645 |
| | 18.3306 | -0.645 | | 10.8694 | -0.645 |
| | 18.1111 | -0.645 | | 10.6500 | -0.645 |
| | 17.8917 | -0.645 | | 10.4306 | -0.645 |
| | 17.6722 | -0.645 | | 10.2111 | -0.645 |
| | 17.4528 | -0.645 | | 9.9917 | -0.645 |
| | 17.2333 | -0.645 | | 9.7722 | -0.645 |
| | 17.0139 | -0.645 | | 9.5528 | -0.645 |
| | 16.7944 | -0.645 | | 9.3333 | -0.645 |
| | 16.5750 | -0.645 | | 9.1139 | -0.645 |
| | 16.3556 | -0.645 | | 8.8944 | -0.645 |
| | 16.1361 | -0.645 | | 8.6750 | -0.645 |
| | 15.9167 | -0.645 | | 8.4556 | -0.645 |
| | 15.6972 | -0.645 | | 8.2361 | -0.645 |
| | | | 194 | 8.0167 | -0.600 |

FIG. 6A-2

| | Line 184 | | | Line 184 Continued | | | Line 185 | | | Line 185 Continued | |
|---|---|---|---|---|---|---|---|---|---|---|---|
| Ref. | Inches from 1st Traverse Pt. | Fiber Angle | Ref. | Inches from 1st Traverse Pt. | Fiber Angle | Ref. | Inches from 1st Traverse Pt. | Fiber Angle | Ref. | Inches from 1st Traverse Pt. | Fiber Angle |
| | 8.0667 | 0.0000 | | 15.2667 | 0.1542 | | 22.3472 | -0.6450 | | 14.8861 | -0.6450 |
| | 8.2667 | 0.0035 | | 15.4667 | 0.1541 | | 22.1278 | -0.6450 | | 14.6667 | -0.6450 |
| | 8.4667 | 0.0074 | | 15.6667 | 0.1535 | | 21.9083 | -0.6450 | | 14.4472 | -0.6450 |
| | 8.6667 | 0.0116 | | 15.8667 | 0.1526 | | 21.6889 | -0.6450 | | 14.2278 | -0.6450 |
| | 8.8667 | 0.0160 | | 16.0667 | 0.1513 | | 21.4694 | -0.6450 | | 14.0083 | -0.6450 |
| | 9.0667 | 0.0208 | | 16.2667 | 0.1496 | | 21.2500 | -0.6450 | | 13.7889 | -0.6450 |
| | 9.2667 | 0.0257 | | 16.4667 | 0.1474 | | 21.0306 | -0.6450 | | 13.5694 | -0.6450 |
| | 9.4667 | 0.0309 | | 16.6667 | 0.1449 | | 20.8111 | -0.6450 | | 13.3500 | -0.6450 |
| | 9.6667 | 0.0363 | | 16.8667 | 0.1421 | | 20.5917 | -0.6450 | | 13.1306 | -0.6450 |
| | 9.8667 | 0.0418 | | 17.0667 | 0.1388 | | 20.3722 | -0.6450 | | 12.9111 | -0.6450 |
| | 10.0667 | 0.0475 | | 17.2667 | 0.1353 | | 20.1528 | -0.6450 | | 12.6917 | -0.6450 |
| | 10.2667 | 0.0532 | | 17.4667 | 0.1314 | | 19.9333 | -0.6450 | | 12.4722 | -0.6450 |
| | 10.4667 | 0.0591 | | 17.6667 | 0.1272 | | 19.7139 | -0.6450 | | 12.2528 | -0.6450 |
| | 10.6667 | 0.0650 | | 17.8667 | 0.1227 | | 19.4944 | -0.6450 | | 12.0333 | -0.6450 |
| | 10.8667 | 0.0709 | | 18.0667 | 0.1180 | | 19.2750 | -0.6450 | | 11.8139 | -0.6450 |
| | 11.0667 | 0.0768 | | 18.2667 | 0.1131 | | 19.0556 | -0.6450 | | 11.5944 | -0.6450 |
| | 11.2667 | 0.0827 | | 18.4667 | 0.1079 | | 18.8361 | -0.6450 | | 11.3750 | -0.6450 |
| | 11.4667 | 0.0885 | | 18.6667 | 0.1025 | | 18.6167 | -0.6450 | | 11.1556 | -0.6450 |
| | 11.6667 | 0.0942 | | 18.8667 | 0.0970 | | 18.3972 | -0.6450 | | 10.9361 | -0.6450 |
| | 11.8667 | 0.0998 | | 19.0667 | 0.0913 | | 18.1778 | -0.6450 | | 10.7167 | -0.6450 |
| | 12.0667 | 0.1052 | | 19.2667 | 0.0856 | | 17.9583 | -0.6450 | | 10.4972 | -0.6450 |
| | 12.2667 | 0.1105 | | 19.4667 | 0.0797 | | 17.7389 | -0.6450 | | 10.2778 | -0.6450 |
| | 12.4667 | 0.1156 | | 19.6667 | 0.0738 | | 17.5194 | -0.6450 | | 10.0583 | -0.6450 |
| | 12.6667 | 0.1204 | | 19.8667 | 0.0679 | | 17.3000 | -0.6450 | | 9.8389 | -0.6450 |
| | 12.8667 | 0.1250 | | 20.0667 | 0.0620 | | 17.0806 | -0.6450 | | 9.6194 | -0.6450 |
| | 13.0667 | 0.1293 | | 20.2667 | 0.0561 | | 16.8611 | -0.6450 | | 9.4000 | -0.6450 |
| | 13.2667 | 0.1334 | | 20.4667 | 0.0503 | | 16.6417 | -0.6450 | | 9.1806 | -0.6450 |
| | 13.4667 | 0.1371 | | 20.6667 | 0.0446 | | 16.4222 | -0.6450 | | 8.9611 | -0.6450 |
| | 13.6667 | 0.1405 | | 20.8667 | 0.0390 | | 16.2028 | -0.6450 | | 8.7417 | -0.6450 |
| | 13.8667 | 0.1435 | | 21.0667 | 0.0336 | | 15.9833 | -0.6450 | | 8.5222 | -0.6450 |
| | 14.0667 | 0.1462 | | 21.2667 | 0.0283 | | 15.7639 | -0.6450 | | 8.3028 | -0.6450 |
| | 14.2667 | 0.1485 | | 21.4667 | 0.0232 | | 15.5444 | -0.6450 | | 8.0833 | -0.6450 |
| | 14.4667 | 0.1505 | | 21.6667 | 0.0184 | | 15.3250 | -0.6450 | | 7.8639 | -0.6450 |
| | 14.6667 | 0.1520 | | 21.8667 | 0.0138 | | 15.1056 | -0.6450 | | 7.6444 | -0.6450 |
| | 14.8667 | 0.1531 | | 22.0667 | 0.0095 | | | | 196 | 7.4250 | -0.7000 |
| | 15.0667 | 0.1538 | | 22.2667 | 0.0054 | | | | | | |
| | | | 195 | 22.4667 | 0.0017 | | | | | | |

FIG. 6B

| Line 281 | | | Line 282 | | | Line 282 Continued | | |
| --- | --- | --- | --- | --- | --- | --- | --- | --- |
| Ref. | Inches from 1st Traverse Pt. | Fiber Angle | Ref. | Inches from 1st Traverse Pt. | Fiber Angle | Ref. | Inches from 1st Traverse Pt. | Fiber Angle |
| 291 | 16.0200 | -0.3267 | | 8.4265 | 0.0001 | | 11.9715 | 0.1104 |
| | 16.0000 | -0.3267 | | 8.5129 | 0.0015 | | 12.0579 | 0.1101 |
| | 15.0000 | -0.3267 | | 8.5994 | 0.0031 | | 12.1444 | 0.1096 |
| | 14.0000 | -0.3267 | | 8.6859 | 0.0050 | | 12.2309 | 0.1087 |
| | 13.0000 | -0.3267 | | 8.7723 | 0.0070 | | 12.3173 | 0.1076 |
| | 12.0000 | -0.3267 | | 8.8588 | 0.0094 | | 12.4038 | 0.1063 |
| | 11.0000 | -0.3267 | | 8.9452 | 0.0119 | | 12.4902 | 0.1047 |
| | 10.0000 | -0.3267 | | 9.0317 | 0.0146 | | 12.5767 | 0.1028 |
| | 9.0000 | -0.3267 | | 9.1182 | 0.0176 | | 12.6632 | 0.1008 |
| 292 | 8.3400 | -0.3267 | | 9.2046 | 0.0207 | | 12.7496 | 0.0984 |
| | | | | 9.2911 | 0.0240 | | 12.8361 | 0.0959 |
| | | | | 9.3776 | 0.0274 | | 12.9226 | 0.0932 |
| | | | | 9.4640 | 0.0309 | | 13.0090 | 0.0902 |
| | | | | 9.5505 | 0.0346 | | 13.0955 | 0.0871 |
| | | | | 9.6370 | 0.0383 | | 13.1820 | 0.0838 |
| | | | | 9.7234 | 0.0421 | | 13.2684 | 0.0804 |
| | | | | 9.8099 | 0.0460 | | 13.3549 | 0.0769 |
| | | | | 9.8963 | 0.0500 | | 13.4413 | 0.0732 |
| | | | | 9.9828 | 0.0539 | | 13.5278 | 0.0695 |
| | | | | 10.0693 | 0.0578 | | 13.6143 | 0.0656 |
| | | | | 10.1557 | 0.0618 | | 13.7007 | 0.0618 |
| | | | | 10.2422 | 0.0656 | | 13.7872 | 0.0578 |
| | | | | 10.3287 | 0.0695 | | 13.8737 | 0.0539 |
| | | | | 10.4151 | 0.0732 | | 13.9601 | 0.0500 |
| | | | | 10.5016 | 0.0769 | | 14.0466 | 0.0460 |
| | | | | 10.5880 | 0.0804 | | 14.1330 | 0.0421 |
| | | | | 10.6745 | 0.0838 | | 14.2195 | 0.0383 |
| | | | | 10.7610 | 0.0871 | | 14.3060 | 0.0346 |
| | | | | 10.8474 | 0.0902 | | 14.3924 | 0.0309 |
| | | | | 10.9339 | 0.0932 | | 14.4789 | 0.0274 |
| | | | | 11.0204 | 0.0959 | | 14.5654 | 0.0240 |
| | | | | 11.1068 | 0.0984 | | 14.6518 | 0.0207 |
| | | | | 11.1933 | 0.1008 | | 14.7383 | 0.0176 |
| | | | | 11.2798 | 0.1028 | | 14.8248 | 0.0146 |
| | | | | 11.3662 | 0.1047 | | 14.9112 | 0.0119 |
| | | | | 11.4527 | 0.1063 | | 14.9977 | 0.0094 |
| | | | | 11.5391 | 0.1076 | | 15.0841 | 0.0070 |
| | | | | 11.6256 | 0.1087 | | 15.1706 | 0.0050 |
| | | | | 11.7121 | 0.1096 | | 15.2571 | 0.0031 |
| | | | | 11.7985 | 0.1101 | | 15.3435 | 0.0015 |
| | | | | 11.8850 | 0.1104 | 293 | 15.4300 | 0.0001 |

FIG. 8A

| | Line 283 | | | Line 284 | | | Line 284 Continued | |
|---|---|---|---|---|---|---|---|---|
| Ref. | Inches from 1st Traverse Pt. | Fiber Angle | Ref. | Inches from 1st Traverse Pt. | Fiber Angle | Ref. | Inches from 1st Traverse Pt. | Fiber Angle |
| | 15.4300 | -0.3267 | | 7.9782 | 0.0001 | | 11.4537 | 0.1101 |
| | 15.0000 | -0.3267 | | 8.0673 | 0.0015 | | 11.5428 | 0.1104 |
| | 14.0000 | -0.3267 | | 8.1565 | 0.0031 | | 11.6319 | 0.1104 |
| | 13.0000 | -0.3267 | | 8.2456 | 0.0050 | | 11.7210 | 0.1101 |
| | 12.0000 | -0.3267 | | 8.3347 | 0.0070 | | 11.8101 | 0.1096 |
| | 11.0000 | -0.3267 | | 8.4238 | 0.0094 | | 11.8992 | 0.1087 |
| | 10.0000 | -0.3267 | | 8.5129 | 0.0119 | | 11.9884 | 0.1076 |
| | 9.0000 | -0.3267 | | 8.6020 | 0.0146 | | 12.0775 | 0.1063 |
| | 8.0000 | -0.3267 | | 8.6911 | 0.0176 | | 12.1666 | 0.1047 |
| 294 | 7.8000 | -0.3267 | | 8.7803 | 0.0207 | | 12.2557 | 0.1028 |
| | | | | 8.8694 | 0.0240 | | 12.3448 | 0.1008 |
| | | | | 8.9585 | 0.0274 | | 12.4339 | 0.0984 |
| | | | | 9.0476 | 0.0309 | | 12.5230 | 0.0959 |
| | | | | 9.1367 | 0.0346 | | 12.6122 | 0.0932 |
| | | | | 9.2258 | 0.0383 | | 12.7013 | 0.0902 |
| | | | | 9.3149 | 0.0421 | | 12.7904 | 0.0871 |
| | | | | 9.4041 | 0.0460 | | 12.8795 | 0.0838 |
| | | | | 9.4932 | 0.0500 | | 12.9686 | 0.0804 |
| | | | | 9.5823 | 0.0539 | | 13.0577 | 0.0769 |
| | | | | 9.6714 | 0.0578 | | 13.1468 | 0.0732 |
| | | | | 9.7605 | 0.0618 | | 13.2359 | 0.0695 |
| | | | | 9.8496 | 0.0656 | | 13.3251 | 0.0656 |
| | | | | 9.9387 | 0.0695 | | 13.4142 | 0.0618 |
| | | | | 10.0278 | 0.0732 | | 13.5033 | 0.0578 |
| | | | | 10.1170 | 0.0769 | | 13.5924 | 0.0539 |
| | | | | 10.2061 | 0.0804 | | 13.6815 | 0.0500 |
| | | | | 10.2952 | 0.0838 | | 13.7706 | 0.0460 |
| | | | | 10.3843 | 0.0871 | | 13.8597 | 0.0421 |
| | | | | 10.4734 | 0.0902 | | 13.9489 | 0.0383 |
| | | | | 10.5625 | 0.0932 | | 14.0380 | 0.0346 |
| | | | | 10.6516 | 0.0959 | | 14.1271 | 0.0309 |
| | | | | 10.7408 | 0.0984 | | 14.2162 | 0.0274 |
| | | | | 10.8299 | 0.1008 | | 14.3053 | 0.0240 |
| | | | | 10.9190 | 0.1028 | | 14.3944 | 0.0207 |
| | | | | 11.0081 | 0.1047 | | 14.4835 | 0.0176 |
| | | | | 11.0972 | 0.1063 | | 14.5727 | 0.0146 |
| | | | | 11.1863 | 0.1076 | | 14.6618 | 0.0119 |
| | | | | 11.2754 | 0.1087 | | 14.7509 | 0.0094 |
| | | | | 11.3646 | 0.1096 | 295 | 14.8400 | 0.0070 |

FIG. 8B

METHOD OF MANUFACTURING A FIBERGLASS MAT

CROSS-REFERENCE TO RELATED DOCUMENTS

This Application claims the benefit of Provisional Application Ser. No. 61/233,116 filed Aug. 11, 2009, entitled Method of Forming a Fiberglass Mat, which is hereby incorporated by reference in its entirety.

BACKGROUND

1. Field of the Invention

This invention pertains to a method of manufacturing a fiberglass mat.

2. Description of the Related Art

Technology for making a condensed mat of glass fiber strands is known in the art. Such technology includes, for example, the Modigliani process. The Modigliani process is generally described in several patents issued to Modigliani, namely, U.S. Pat. Nos. 2,546,230; 2,609,320 and 2,964,439. Subsequent improvements and variations of the Modigliani process have been made and are known in the art—many of which are described in patents issued subsequent to the Modigliani patents. The aforementioned patents and improvements generally involve a melting furnace feeding molten glass to orifices which discharge fine glass fibers. The fine glass fibers are in turn wrapped circumferentially around a rotating drum. During the deposition of the fibers on the rotating drum, a thermosetting resin may be applied to the surface to hold the fibers at their overlapping junctions between layers.

The furnace and/or orifices may move longitudinally back and forth along the rotating drum while the drum remains longitudinally stationary during the assembly process. Alternatively, the furnace and orifices may remain stationary while the drum rotates and moves longitudinally back and forth with respect to the stationary furnace.

After a suitable thickness of fibers has been created, the condensed mat may be severed from the drum by, for example, a cut across the mat parallel with the axis of the drum. Thereafter, the condensed mat may be stretched or expanded longitudinally and or latitudinally as desired.

SUMMARY

Generally, in one aspect, a method of forming a fiberglass mat comprises the steps of rotating a drum, feeding a molten fiberglass material through at least one orifice of a furnace while rotating the drum, and altering the relative position of the orifice with respect to a location on the drum while rotating the drum and feeding the molten fiber glass material through the orifice to build up a fiberglass matt along a traverse length. During at least a portion of building up the fiberglass mat the relative position of the orifice with respect to the location on the drum is moving at a variable speed in a first direction for less than the traverse length then moving at a substantially constant speed in a second direction for less than the traverse length a plurality of times. The first direction is substantially opposite the second direction.

In some embodiments the drum is traversable along a drum traverse path substantially parallel with an axis of rotation of the drum. In versions of those embodiments the orifice is traversable along a furnace traverse path substantially parallel with the axis of rotation of the drum.

In some embodiments the substantially constant speed is at least three times greater than the maximum speed of the variable speed. In versions of those embodiments the distance of each first direction movement is less than twenty-five percent of the traverse length. In versions of those embodiments the difference in distance between each first direction movement and each second direction movement is less than five percent of the traverse length. In versions of those embodiments the variable speed is sinusoidally variable.

Generally, in another aspect, a method of forming a fiberglass mat, comprises the steps of rotating a drum, feeding a molten fiberglass material through at least one orifice of a furnace while rotating the drum, and traversing one of the drum and the furnace back and forth along a traverse path such that a first end thereof moves between a first traverse location and a second traverse location while maintaining the other of the drum and the furnace in a substantially stationary position while rotating the drum and feeding the molten fiber glass material through the orifice to build up the fiberglass mat. The traverse path is generally perpendicular to the rotation of the drum. A plurality of traverses of the first end between the first traverse location and the second traverse location are fiber curl traverses. During at least a portion of movement of the first end between the first traverse location and the second traverse location during the fiber curl traverses the first end is: moving along the traverse path in a first direction from a first location between the first traverse location and the second traverse location, the first location being more proximal the first traverse location than the second traverse location; stopping at a second location between the first traverse location and the second traverse location, the second location being more proximal to the second traverse location than the first location is to the second traverse location; moving along the traverse path in a second direction generally opposite the first direction; stopping at a third location between the first traverse location and the second traverse location, the third location being more proximal to the first traverse location than the second location is to the first traverse location; and moving in the first direction.

In some embodiments the third location is between the first location and the second location.

In some embodiments the third location is between the first location and the first traverse location. In versions of those embodiments the step of stopping at a fourth location between the first traverse location and the second traverse location more proximal to the second traverse location than the third location is to the second traverse location. In versions of those embodiments the fourth location is between the second location and the second traverse location. In versions of those embodiments the first end of the drum is traversed back and forth along the traverse path between the first traverse location and the second traverse location while maintaining the furnace in a substantially stationary position.

Generally, in another aspect, a method of forming a fiberglass mat, comprises the steps of rotating a drum, feeding a molten fiberglass material through at least one orifice of a furnace while rotating the drum, and traversing one of the drum and the furnace back and forth along a traverse path such that a first end thereof moves between a first traverse location and a second traverse location while rotating the drum and feeding the molten fiber glass material through the orifice to build up the fiberglass mat. A plurality of traverses of the first end between the first traverse location and the second traverse location are fiber curl traverses. During a portion of movement of the first end between the first traverse location and the second traverse location during the fiber curl traverses the position of the first end is: moving at a variable speed along the traverse path in a first direction from a first location between the first traverse location and the second traverse location, the first location being more proximal the first traverse location than the second traverse location; stopping at a second location between the first traverse location and the second traverse location, the second location being more proximal to the second traverse location than the first location is to the second traverse location; the distance between the first location and the third location is less than twenty-five percent of the distance between the first traverse location and the second traverse location; moving along the traverse path in a second direction generally opposite the first direction; stopping at a third location between the first traverse location and the second traverse location more proximal to the first traverse location than the second location is to the first traverse location; the distance between the second location and the third location is less than twenty-five percent of the distance between the first traverse location and the second traverse location; and moving at a variable speed in the first direction.

In some embodiments movement in the second direction is at a second variable speed distinct from the first variable speed.

In some embodiments movement in the second direction is at a substantially constant speed. In versions of those embodiments the third location is between the first location and the first traverse location. In versions of those embodiments the distance between the third location and the first location is less than five percent of the distance between the first traverse location and the second traverse location. In versions of those embodiments the substantially constant speed is at least three times greater than the maximum speed of the variable speed.

In some embodiments the distance between the third location and the first location is less than one percent of the distance between the first traverse location and the second traverse location.

BRIEF DESCRIPTION OF THE ILLUSTRATIONS

FIG. 3A is a graphical depiction of an embodiment of a method of forming a skin layer in a fiberglass mat;

FIG. 3B is a graphical depiction of an embodiment of a method of forming a loft layer in a fiberglass mat;

FIGS. 6A-1 and 6A-2 are tables having a plurality of values for three of the lines depicted in the graphical depiction of the second embodiment of a method of forming a fiber curl layer in a fiberglass mat of FIG. 5;

FIG. 6B is a table having a plurality of values for two of the lines depicted in the graphical depiction of the second embodiment of a method of forming a fiber curl layer in a fiberglass mat of FIG. 5;

FIGS. 8A and 8B are tables having a plurality of values for each of the lines depicted in the graphical depiction of the third embodiment of a method of forming a fiber curl layer in a fiberglass mat of FIG. 7.

DETAILED DESCRIPTION

Figure 1:
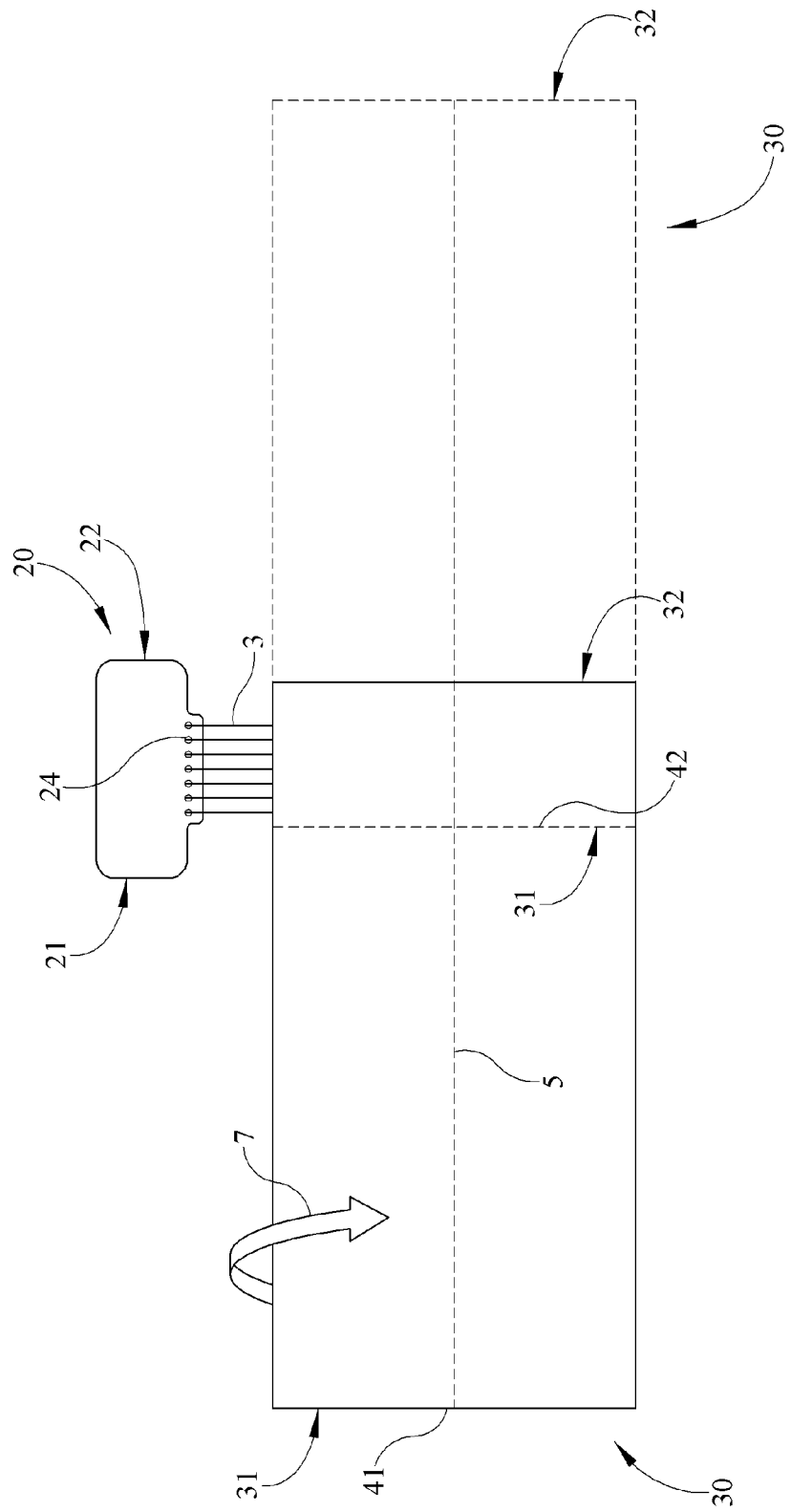
FIG. 1 is a front view of a stationary furnace and a traversable drum that may be utilized in embodiments of the method of manufacturing a fiberglass mat of the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Referring now to FIG. 1 through FIGS. 8A and 8B wherein like numerals refer to like parts, embodiments of a method of manufacturing a fiberglass mat will be described in detail. Referring initially to FIG. 1, a furnace 20 and a drum 30 that may be utilized in the embodiments of the method described herein are shown. The furnace 20 may be mounted to a structure in a substantially stationary position. The furnace 20 has a furnace first end 21 and a furnace second end 22. The furnace 20 has a plurality of orifices 24 provided adjacent the drum 30 through which molten fiberglass material 3 may exit and be deposited onto the drum 30. The drum 30 has a drum first end 31 and a drum second end 32 and may be traversed along a traverse path generally indicated by a dotted line 5. The drum 30 may be traversed such that drum first end 31 thereof moves a preselected traverse length between a first drum traverse location 41 and a second drum traverse location 42. In FIG. 1 the drum 30 is depicted in solid lines with the first drum end 31 substantially aligned with the first drum traverse location 41. In FIG. 1 the drum 30 is also depicted in dotted lines with the first drum end 31 substantially aligned with the second drum traverse location 42. In some embodiments the drum 30 may be traversed along traverse path 5 by a sprocket and chain drive that may be driven by a variable speed motor controlled by a programmable logic control (PLC). The PLC may in some embodiments replace original eccentric and concentric sprockets in the sprocket and chain drive. In other embodiments the drum 30 may be traversed along traverse path 5 using other technology such as, for example, using a linear drive or using a motor in combination with timing belts. The drum 30 is also rotatable in a direction of rotation indicated generally by arrow 7. In the depicted embodiment the traverse path 5 is generally parallel with the axis of rotation of the drum 30.

Figure 2:
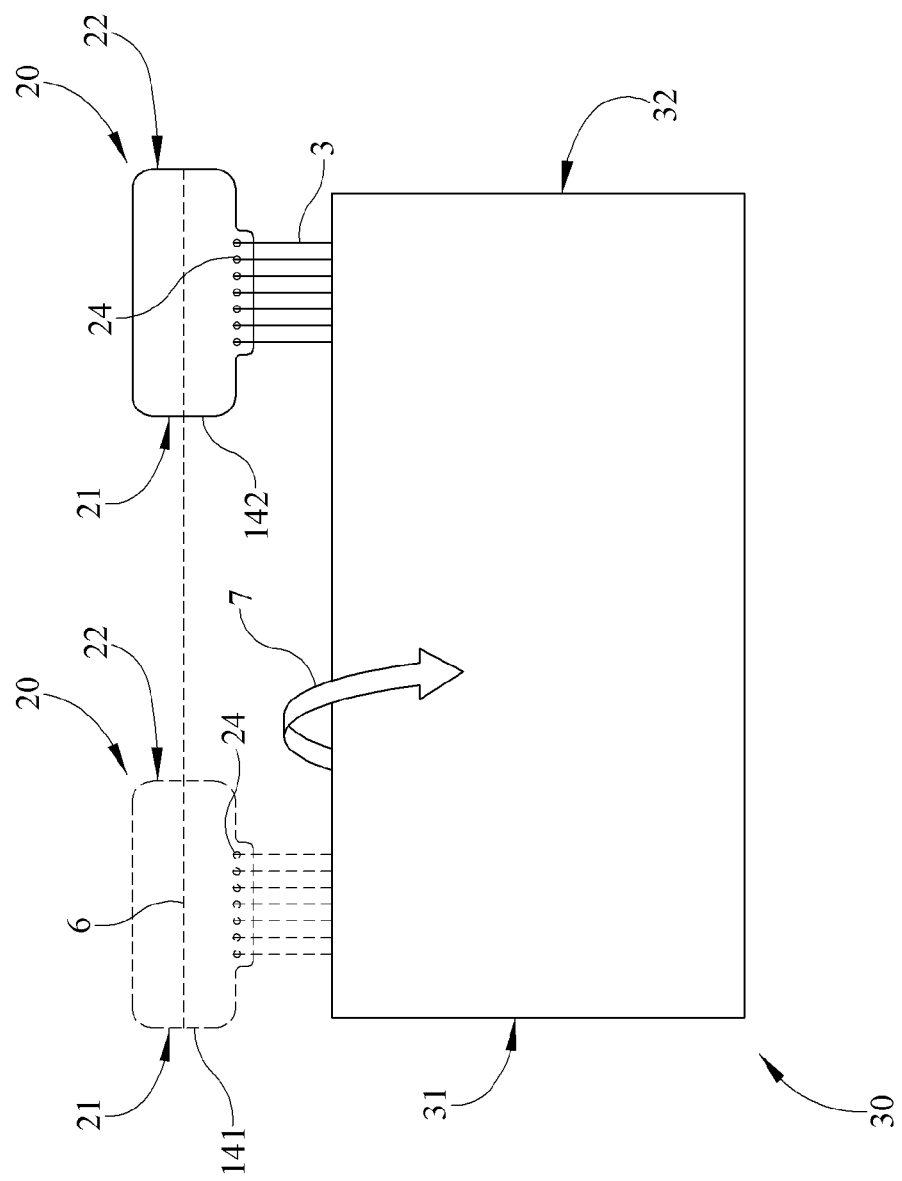
FIG. 2 is a front view of a traversable furnace and a stationary drum that may be utilized in embodiments of the method of manufacturing a fiberglass mat of the present invention.

Alternatively, as depicted in FIG. 2, the drum 30 may be mounted to a structure in a substantially stationary position. The furnace 20 may be traversed such that the first furnace end thereof moves a preselected traverse length between a first furnace traverse location 141 and a second furnace traverse location 142. In FIG. 2 the furnace 20 is depicted in solid lines with the first furnace end 21 substantially aligned with the first furnace traverse location 141. In FIG. 2 the furnace 20 is also depicted in dotted lines with the first furnace end 22 substantially aligned with the second furnace traverse location 142. In some embodiments the furnace 20 may be traversed along a traverse path generally indicated by dotted line 6 by a sprocket and chain drive that may be driven by a variable speed motor controlled by a programmable logic control (PLC). The PLC may replace original eccentric and concentric sprockets in the sprocket and chain drive. In other embodiments the drum 30 may be traversed along traverse path 5 using other technology such as, for example, using a linear drive or using a motor in combination with timing belts. In the depicted embodiment the traverse path 6 is generally parallel with the axis of rotation of the drum 30.

The drum 30, the furnace 20, and interaction between the drum 30 and the furnace 20 are shown in FIGS. 1 and 2 are described herein in detail. One skilled in the art will realize that the embodiments of a method of manufacturing a fiberglass mat described herein may also be utilized with a drum, a furnace, and/or interactions between a drum and a furnace that may vary in one or more respects from those shown in FIGS. 1 and 2. For example, in some embodiments both the furnace and the drum may be traversable to build up a fiberglass mat along a traverse length. Also, for example, in some embodiments the traverse length of the drum 30 and/or the furnace 20 may be altered such that less than or more of the drum 30 will be covered with a fiberglass mat. Throughout the remainder of this detailed description it will often be referenced that the first drum end 31 of drum 30 is being traversed between the first traverse location 41 and the second traverse location 42 and that the furnace 20 is remaining substantially stationary. Such description herein is for ease in description only and should not be regarded as limiting.

In FIGS. 3A and 3B, two traditional methods of forming a layer in a fiberglass mat are generally depicted in graphical form. In traditional methods of forming a layer in a fiberglass mat the drum 30 is traversed back and forth from the first traverse location 41 to the second traverse location 42 at either a constant (concentric) or a varying (eccentric) speed. The drum 30 is moving in a single direction only as drum first end 31 traverses from the first traverse location 41 to the second traverse location 42 and drum 30 moves in a single opposite direction as drum first end 31 traverses from the second traverse location 42 to the first traverse location 41. Typically, a single direction substantially constant speed is used to form skin or backing layers and a variable speed, such as, for example, a sinusoidally variable speed, is used to form lofting layers.

Referring particularly to FIG. 3A, a skin layer traverse as drum first end 31 moves from the first traverse location 41 to the second traverse location 42 and a skin layer traverse as drum first end 31 moves from the second traverse location 42 to the first traverse location 41 is graphically depicted. The left most horizontal location in the graph of FIG. 3A represents the positioning of the first traverse location 41. The right most horizontal location in the graph of FIG. 3A represents the positioning of the second traverse location 42. Skin line 102 tracks the drum first end 31 as the drum 30 moves at a constant speed, causing the drum first end 31 to move from the first traverse location 41 to the second traverse location 42. The drum 30 then stops (transitioning around a sprocket in some embodiments) as the drum first end 31 reaches the second traverse location 42 and the drum 30 moves in an opposite direction at substantially the same constant speed. This causes the drum first end 31 to move back in the opposite direction to the first traverse location 41, as represented by skin line 103. Multiple substantially constant speed traverses of the drum 30, wherein the drum first end 31 moves back and forth between the first traverse location 41 and the second traverse location 42 may occur while the drum 30 is rotating to achieve a skin layer.

Referring particularly to FIG. 3B, a body layer traverse as drum first end 31 moves from the first traverse location 41 to the second traverse location 42 and a body layer traverse as drum first end 31 moves from the second traverse location 42 to the first traverse location 41 is graphically depicted. The left most horizontal location in the graph of FIG. 3B represents the positioning of the first traverse location 41. The right most horizontal location in the graph of FIG. 3B represents the positioning of the second traverse location 42. Loft line 104 tracks drum first end 31 as the drum 30 moves at a sinusoidally variable speed, causing the drum first end 31 to move from the first traverse location 41 to the second traverse location 42. The drum 30 then stops (transitioning around a sprocket in some embodiments) and the drum 30 moves in an opposite direction at a sinusoidally variable speed, causing the drum first end to move from the second traverse location 42 back to the first traverse location 41, as represented by loft line 105. Multiple variable speed traverses of the drum 30, wherein the drum first end 31 moves back and forth between the first traverse location 41 and the second traverse location 42, may occur while the drum 30 is rotating to achieve a loft or body layer. In alternative embodiments of forming a body layer the centerline, the amplitude, phase and/or frequency of loft line 104 and/or loft line 105 may be adjusted.

Figure 4:
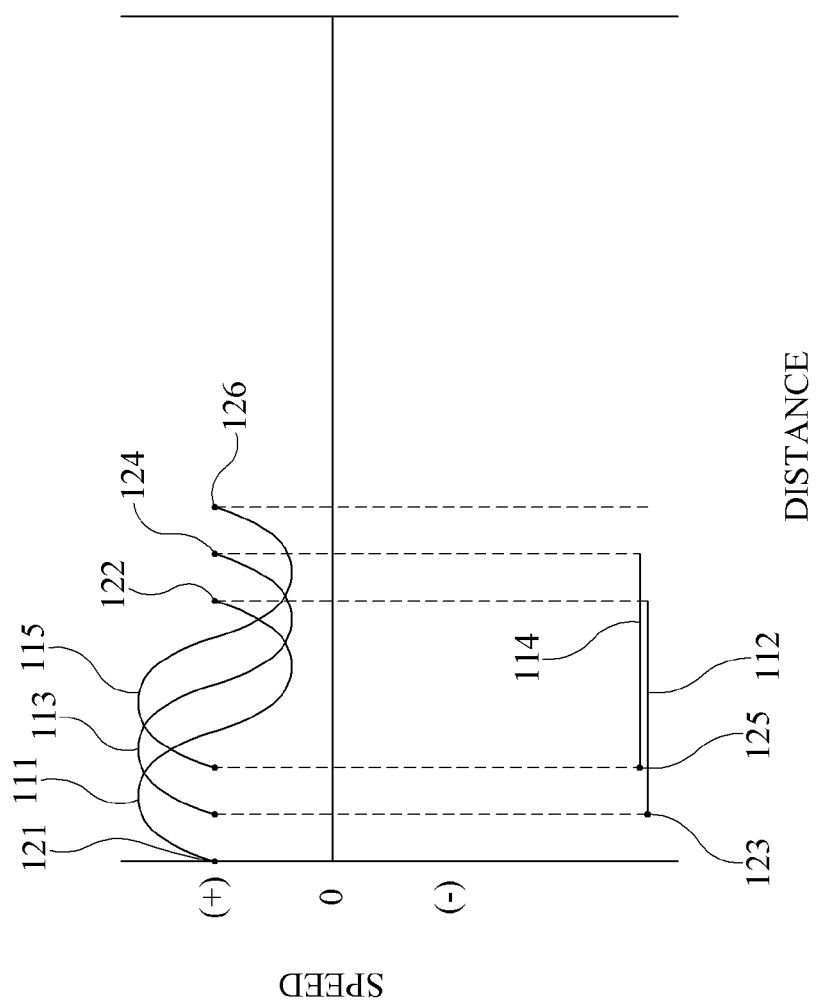
FIG. 4 is a graphical depiction of an embodiment of a method of forming a fiber curl layer in a fiberglass mat.

Referring now to FIG. 4, a first embodiment of a method of forming a fiber curl layer in a fiberglass mat is depicted in graphical form. The horizontal axis in the graph of FIG. 4 represents distance, with the left most location in the horizontal axis representing the positioning of the first traverse location 41. The right most horizontal location in the graph of FIG. 4 represents the second traverse location 42. The vertical axis in the graph of FIG. 4 represents velocity of the drum 30 in the direction of the traverse path 5. A positive velocity in FIG. 4 indicates the drum first end 31 is moving in a direction from the first traverse location 41 to the second traverse location 42 and a negative velocity in FIG. 4 indicates the drum first end 31 is moving in a direction from the second traverse location 42 to the first traverse location 41.

Still referring to FIG. 4, line 111 tracks the drum first end 31 as it moves at a sinusoidally variable speed from a location 121 adjacent the first traverse location 41 to a location 122, where it comes to a stop. Location 122 is more proximal the second traverse location 42 than location 121 is to the second traverse location 42. Line 112 tracks the drum first end 31 as it is then traversed in an opposite or reverse direction back toward first traverse location 41 at a substantially constant speed to location 123, where it comes to a stop. It is understood that in some embodiments the drum 30 may not come to an instantaneous stop and instantaneously reverse paths as depicted in the graph of FIG. 4, but instead may require a certain distance to come to a complete stop and a certain distance to reverse paths and ramp up to a desired speed. Location 123 is located between location 121 and location 122. In some embodiments the substantially constant speed movement may be greater than the maximum speed of the variable speed movement in the opposite direction. For example, in some embodiments, the substantially constant speed movement may be approximately four times greater than the maximum speed of the variable speed movement in the opposite direction. Also, for example, in some embodiments, the substantially constant speed movement may be approximately three times greater than the maximum speed of the variable speed movement in the opposite direction. Line 113 tracks the drum first end 31 as it moves at a sinusoidally variable speed from location 123 to a location 124, where it comes to a stop. Location 124 is more proximal the second traverse location 42 than location 123 is to the second traverse location 42. Line 114 tracks the drum first end 31 as it is then traversed in an opposite direction back toward first traverse location 41 at a substantially constant speed to location 125, where it comes to a stop. Location 125 is located between location 122 and location 123. Line 115 tracks the drum first end 31 as it moves at a sinusoidally variable speed from location 125 to location 126, where it comes to a stop.

Only a portion of a traverse from first traverse location 41 to second traverse location 42 is illustrated in FIG. 4. However, it is clear that the pattern depicted in FIG. 4 of moving the drum 30 in a first direction at a variable speed for less than the traverse length, then moving the drum 30 in an opposite direction at a substantially constant speed for less than the traverse length may be repeated until a full traverse of the drum 30 has been completed, such that the drum first end 31 has moved from the first traverse location 41 to the second traverse location 42. Moreover, a similar pattern may be followed as the drum 30 continues to traverse in an opposite direction, such that the drum first end 31 moves from the second traverse location 42 to the first traverse location 41. A plurality of traverses of the drum 30 back and forth, such that drum first end 31 moves back and forth between first traverse location 41 and the second traverse location 42 may be made while repeating the pattern to produce a fiber curl layer. In some embodiments the fiber curl layer created has an open characteristic, has slightly bundled fibers, and has an increased random curl to the fibers when the fiberglass mat is cut off the drum 30 and subsequently expanded. In some embodiments the slight bundling and added curl of the fibers may provide increased strength in the final filter product.

In some embodiments of manufacturing a fiberglass mat, a mat may be manufactured that combines the fiber curl layer described herein with other layers. For example, a skin layer as known in the art and described herein, may comprise a first layer of a mat and may be manufactured by traversing the drum 30 back and forth at a substantially constant speed, wherein drum first end 31 is moved back and forth between first traverse location 41 and second traverse location 42 at a substantially constant speed. A fiber curl layer as described herein may comprise a second layer of the mat and may be formed atop the skin layer. Also, for example, a first skin layer as known in the art and described herein, may comprise a first layer of a mat, a fiber curl layer may comprise a second layer of the mat and may be formed atop the first skin layer, and a second skin layer may comprise a third layer of a mat and be formed atop the fiber curl layer.

Also, for example, a skin layer as known in the art and described herein, may comprise a first layer of a mat, a loft or body layer as described herein may comprise a second layer of a mat and may be formed atop the skin layer, and a fiber curl layer may comprise a third layer of the mat and may be formed atop the body layer. The loft or body layer may comprise two or more distinct layers. For example, the drum 30 may be traversed back and forth at a first sinusoidally variable speed having a first amplitude a plurality of times, and then may be traversed back and forth at a second sinusoidally variable speed having a second amplitude a plurality of times. The mats described herein may be subsequently expanded and used in various industries such as, for example, the paint air filtration industry.

In accordance with embodiments of the method described herein, many variations may be made to the movement of the drum 30 to produce various products that have one or more fiber curl layers having different visual characteristics, different mechanical characteristics, and/or different filter characteristics. For example, in some embodiments when producing a fiber curl layer it is not necessary that certain movements of the drum 30 be at a substantially constant speed. For example, during a single traverse of the drum 30 along a traverse length, wherein drum 31 moves between first traverse location 41 and second traverse location 42, the drum 30 may be moved in a first direction at a first variable speed for less than the traverse length, then the drum 30 moved in an opposite direction at a second variable speed for less than the traverse length, and this general movement may be repeated until a single traverse of the drum 30 has been completed. The first variable speed and the second variable speed may vary with respect to one another in a number of ways such as, for example, average speed, maximum speed, minimum speed, amplitude, frequency, and/or waveform.

Also, for example, in some embodiments one or more variable speed movements may be non-sinusoidal. Also, for example, in some embodiments the centerline, amplitude, phase and/or frequency of the sinusoidal or other variable speed movement may be increased, decreased, and/or varied during one, multiple, or all traverses. Also, for example, the speed of the variable speed movement and/or of the substantially constant speed movement may be increased, decreased, and/or varied during one, multiple, or all traverses. The rotational speed of the drum 30 may also be increased, decreased, and/or varied during one, multiple, or all traverses. Decreasing the drum rotational speed, for example, while keeping other parameters constant may result in a fiber curl layer wherein the fibers are more coarse and the fiber curl layer is more open. Also, for example, cullet or fiberglass throughput through the furnace 20 may be increased, decreased, and/or varied during one, multiple, or all traverses. Also, for example, the amount of any resin applied to the fiberglass mat may be increased, decreased, and/or varied during one, multiple, or all traverses.

Figure 5:
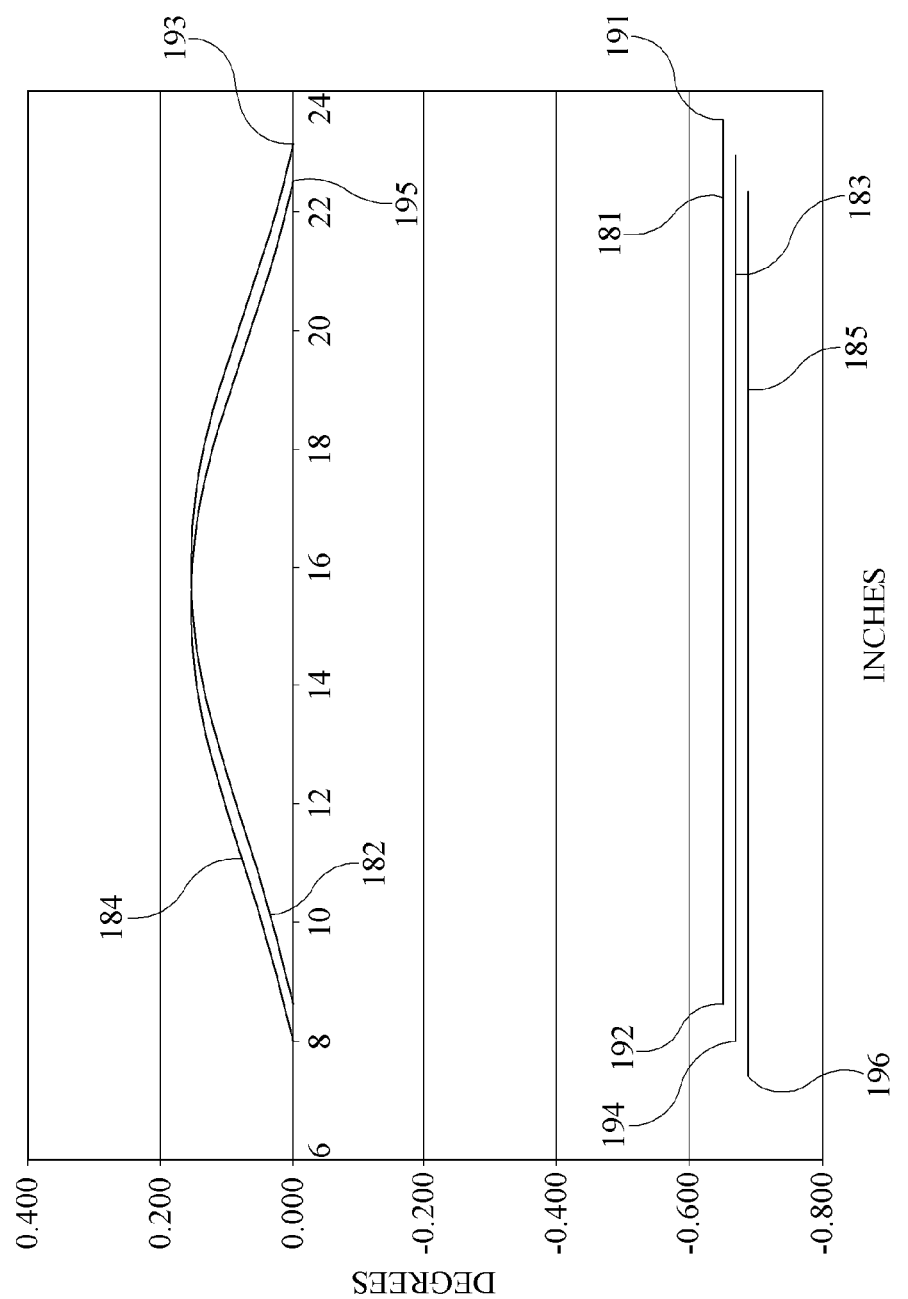
FIG. 5 is a graphical depiction of a second embodiment of a method of forming a fiber curl layer in a fiberglass mat.

Referring now to FIG. 5, a second embodiment of a method of forming a fiber curl layer in a fiberglass mat is depicted in graphical form. The horizontal axis in the graph of FIG. 5 represents distance in inches. The left most location of the horizontal axis represents a location where the drum first end 31 is approximately six inches away from the first traverse location 41. The right most location in the horizontal axis represents a location where the drum first end 31 is approximately twenty-four inches away from the first traverse location 41 and more proximal to the second traverse location 42.

The vertical axis in the graph of FIG. 5 represents the fiber angle, in degrees, of molten fiberglass strands 3 that are being deposited from the furnace 20 onto the drum 30. The fiber angle will be dependent on both the traversing speed of the drum 30 and the rotational speed of the drum 30. As a result, achieving a constant angle does not necessitate traversing of the drum 30 at a constant speed nor does achieving a variable angle necessitate traversing of the drum 30 at a variable speed. The positive fiber angles indicate the drum 30 is traversing in a direction wherein the drum first end 31 is moving from the first traverse location 41 to the second traverse location 42 and the negative fiber angles indicate the drum 30 is traversing in a direction wherein the drum first end 31 is moving from the second traverse location 42 to the first traverse location 41.

Still referring to FIG. 5, line 181 tracks the substantially constant fiber angle of fiber being deposited on the drum 30 as the drum first end 31 moves toward the first traverse location 41 from a location 191 to a location 192, where it comes to a stop. Location 192 is more proximal the first traverse location 41 than location 191 is to the first traverse location 41. Location 191 is a location where the drum first end 31 is approximately 23.53 inches from the first traverse location 41. Location 192 is a location where the drum first end 31 is approximately 8.61 inches from first traverse location 41. In some embodiments the distance between location 191 and location 192 may be approximately one-sixth of the traverse length.

Line 182 tracks the variable fiber angle of fiber being deposited on the drum 30 as the drum 30 is then traversed in an opposite or reverse direction wherein drum first end 31 moves back toward the second traverse location 42 at a variable speed to location 193, where it comes to a stop. Location 193 is located between location 191 and location 192. Location 193 is a location where the drum first end 31 is approximately 23.05 inches from the first traverse location 41. Line 183 tracks the substantially constant fiber angle of fiber being deposited on the drum 30 as the drum 30 moves from location 193 to a location 194, where it comes to a stop. In the embodiment depicted in FIG. 5, the fiber angle of line 183 is the same as the fiber angle of line 181, although line 183 is depicted offset slightly from line 181 for clarity. Location 194 is more proximal the first traverse location 41 than location 193 is to the first traverse location 41. In some embodiments the distance between location 194 and location 192 may be less than one percent of the traverse length. Location 194 is a location where drum first end 31 is approximately 8.02 inches from the first traverse location 41. Line 184 tracks the variable fiber angle of fiber being deposited on the drum 30 as the drum first end 31 moves toward the second traverse location 42 from location 194 to a location 195, where it comes to a stop. Location 195 is a location where the drum first end 31 is approximately 22.47 inches from the first traverse location 41. Line 185 tracks the tracks the substantially constant fiber angle of fiber being deposited on the drum 30 as the drum first end 31 moves toward the first traverse location 41 from location 195 to location 196, where it comes to a stop. In the embodiment depicted in FIG. 5, the fiber angle of line 185 is the same as the fiber angle of line 181 and line 183, although line 185 is depicted offset slightly from line 181 and 183 for clarity. Location 196 is a location where the drum first end 31 is approximately 7.43 inches from the first traverse location 41. In some embodiments the distance between location 196 and location 194 may be less than one percent of the traverse length.

The drum 30 is traversing such that the drum first end 31 is moving from the second traverse location 42 toward the traverse location 41 in FIG. 5, whereas the drum 30 is traversing from the first traverse location 41 toward the second traverse location 42 in FIG. 4. Also, in FIG. 5 the movement of the drum is progressing across the traverse length when the constant fiber angle is being deposited, whereas in FIG. 4 the movement of the drum is progressing across the traverse length when the drum 30 is being moved at a variable speed and variable fiber angles are being deposited.

Referring now to FIGS. 6A-1 and 6A-2 and FIG. 6B, tables are shown that correspond to FIG. 5 and provide a plurality of location and fiber angle values for lines 181, 182, 183, 184, and 185. Locations 191, 192, 193, 194, 195, and 196 are also provided in the tables of FIGS. 6A-1 and 6A-2 and FIG. 6B for ease in reference.

Only a portion of a traverse showing movement of drum first end 31 from second traverse location 42 to first traverse location 41 is illustrated in FIG. 5 and depicted in table form in FIGS. 6A-1 and 6A-2. However, it is clear that the pattern depicted in FIG. 5 and FIGS. 6A-1 and 6A-2 may be repeated until a full traverse of the drum 30 has been completed. Also, it is clear that in some embodiments when the drum first end 31 reaches either the first traverse location 41 or the second traverse location 42, drum 30 may reverse traversing directions while either a variable or a substantially constant fiber angle continues to be laid. Moreover, in some embodiments the drum 30 may reverse directions multiple times as drum first end 31 is near a traverse location as it continues to progress through a predetermined pattern. For example, assume a substantially constant fiber angle is being laid on the drum 30 as the drum first end 31 approaches the first traverse location 41 moving in a first direction. The substantially constant fiber angle may continue to be laid as the drum first end 31 reaches the first traverse location 41 and moves in a second direction toward the second traverse location 42. The drum 30 may then come to a stop and move again in the first direction and a variable angle fiber may be laid on the drum 30 as the drum first end 31 approaches the first traverse location 41 moving in the first direction. The variable angle may continue to be laid as the drum first end 31 reaches the first traverse location 41 and moves in the second direction toward the second traverse location 42. This may occur a plurality of times while the drum first end 31 is proximal to the first traverse location 41 and/or the second traverse location 42.

Figure 7:
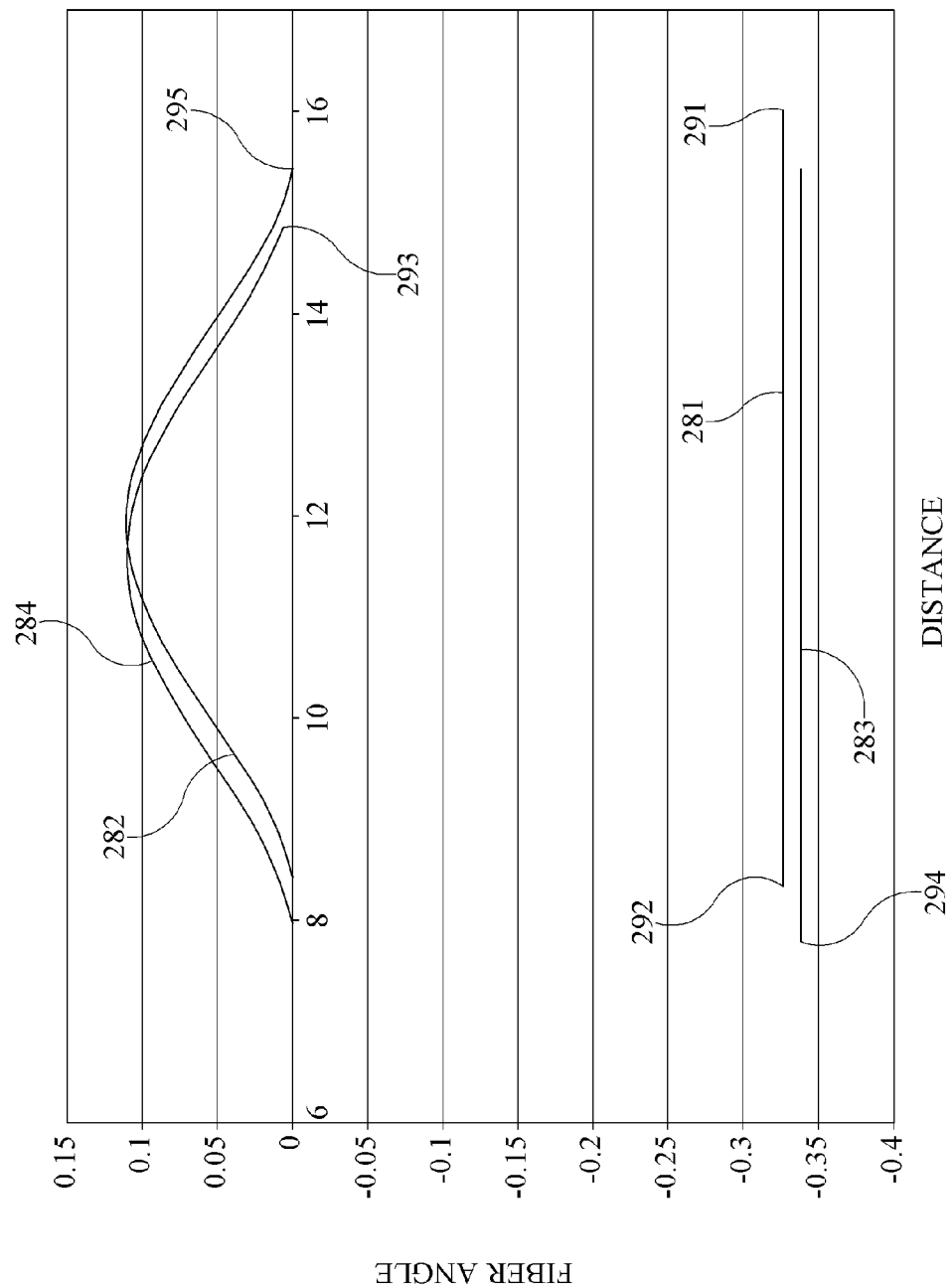
FIG. 7 is a graphical depiction of a third embodiment of a method of forming a fiber curl layer in a fiberglass mat.

Referring now to FIG. 7, a third embodiment of a method of forming a fiber curl layer in a fiberglass mat is depicted in graphical form. The horizontal axis in the graph of FIG. 7 represents distance in inches. The left most location of the horizontal axis represents a location where the drum first end 31 is approximately six inches away from the first traverse location 41. The right most location in the horizontal axis represents a location where the drum first end 31 is approximately seventeen inches away from the first traverse location 41 and more proximal to the second traverse location 42.

The vertical axis in the graph of FIG. 7 represents the fiber angle, in degrees, of molten fiberglass strands 3 that are being deposited from the furnace 20 onto the drum 30. The fiber angle will be dependent on both the traversing speed of the drum 30 and the rotational speed of the drum 30. The positive fiber angles indicate the drum 30 is traversing in a direction wherein the drum first end 31 is moving from the first traverse location 41 to the second traverse location 42 and the negative fiber angles indicate the drum 30 is traversing in a direction wherein the drum first end 31 is moving from the second traverse location 42 to the first traverse location 41.

Still referring to FIG. 7, line 281 tracks the substantially constant fiber angle of fiber being deposited on the drum 30 as the drum first end 31 moves toward the first traverse location 41 from a location 291 to a location 292, where it comes to a stop. Location 292 is more proximal the first traverse location 41 than location 291 is to the first traverse location 41. Location 291 is a location where the drum first end 31 is approximately 16.02 inches from the first traverse location 41. Location 292 is a location where the drum first end 31 is approximately 8.34 inches from first traverse location 41. In some embodiments the distance between location 291 and location 292 may be approximately one-eleventh of the traverse length.

Line 282 tracks the variable fiber angle of fiber being deposited on the drum 30 as the drum 30 is then traversed in an opposite or reverse direction wherein drum first end 31 moves back toward the second traverse location 42 at a variable speed to location 293, where it comes to a stop. Location 293 is located between location 291 and location 292. Location 293 is a location where the drum first end 31 is approximately 15.43 inches from the first traverse location 41. Line 283 tracks the substantially constant fiber angle of fiber being deposited on the drum 30 as the drum 30 moves from location 293 to a location 294, where it comes to a stop. In the embodiment depicted in FIG. 7, the fiber angle of line 283 is the same as the fiber angle of line 281, although line 283 is depicted offset slightly from line 281 for clarity. Location 294 is more proximal the first traverse location 41 than location 293 is to the first traverse location 41. In some embodiments the distance between location 294 and location 292 may be less than one percent of the traverse length. Location 294 is a location where drum first end 31 is approximately 7.8 inches from the first traverse location 41. Line 284 tracks the variable fiber angle of fiber being deposited on the drum 30 as the drum first end 31 moves toward the second traverse location 42 from location 294 to a location 295, where it comes to a stop. Location 295 is a location where the drum first end 31 is approximately 14.84 inches from the first traverse location 41.

The drum 30 is traversing such that the drum first end 31 is moving from the second traverse location 42 toward the traverse location 41 in FIG. 7 and the movement of the drum is progressing across the traverse length when the constant fiber angle is being deposited. As described herein, in some embodiments when the drum first end 31 reaches either the first traverse location 41 or the second traverse location 42, drum 30 may reverse traversing directions while either a variable or a substantially constant fiber angle continues to be laid. Moreover, in some embodiments the drum 30 may reverse directions multiple times as drum first end 31 is near a traverse location as it continues to progress through a predetermined pattern. Also, as described herein, in some embodiments the movement of the drum 30 may alternatively or additionally progress across the traverse length when the variable fiber angle is being deposited.

In some embodiments whether the drum 30 progresses across the traverse length when the variable angle is being laid or when the constant angle is being laid may be dependent upon a controller's analysis of a sine wave having X axis values representative of time and having positive and negative Y axis values. The controller may be in electrical communication with the drum 30 and may cause the drum 30 to move in a certain speed and direction. The controller may cause a variable angle to be laid on the drum 30 when the sine wave has positive Y axis values and may cause a constant angle to be laid on the drum 30 when the sine wave has negative Y values. The sine wave may be shifted along the Y axis as desired to thereby alter the amount of constant and variable fiber angle being laid. Thus, the sine wave may be altered to thereby control whether the drum 30 progresses across the traverse length when the variable angle is being laid or when the constant angle is being laid.

Referring now to FIGS. 8A and 8B, a table is shown that corresponds to FIG. 7 and provides a plurality of location and fiber angle values for lines 281, 282, 283, and 284. Locations 291, 292, 293, 294, and 295 are also provided in the table of FIGS. 8A and 8B for ease in reference.

Only a portion of a traverse showing movement of drum first end 31 from second traverse location 42 to first traverse location 41 is illustrated in FIG. 7 and depicted in table form in FIGS. 8A and 8B. However, it is clear that the pattern depicted in FIGS. 7 and 8A and 8B may be repeated until a full traverse of the drum 30 has been completed. Also, it is clear that in some embodiments when the drum first end 31 reaches either the first traverse location 41 or the second traverse location 42, drum 30 may reverse traversing directions while either a variable or a substantially constant fiber angle continues to be laid. Moreover, in some embodiments the drum 30 may reverse directions multiple times as drum first end 31 is near a traverse location as it continues to progress through a predetermined pattern.

In some embodiments the method of forming a fiber curl layer in a fiberglass mat may be utilized to form a final fiberglass product having a rigid fiber curl layer on an air entry side of the fiberglass mat, a fiberglass skin layer on an air exit side of the final fiberglass product, and a fiberglass loft layer between the fiber curl layer and the skin layer. In some embodiments the fiber curl layer may be manufactured in accordance with the third embodiment of FIGS. 7 and 8A and 8B.

The rigid fiber curl layer may be relatively open and have a number of fibers consistently bundled together to provide rigidity for structural support. The fiber bundles may be in a generally sinusoidal arrangement when the final fiberglass product is created, providing structural support and rigidity along with filtering capacity.

In some embodiments the skin layer may have a thickness of approximately one-quarter of an inch. The body layer may comprise two or more distinct layers. For example, a first loft layer may be immediately adjacent the rigid fiber curl layer and be manufactured by traversing the drum 30 back and forth at a first sinusoidally variable speed having a first amplitude a plurality of times. A second loft layer may be immediately adjacent the skin layer and be manufactured by traversing the drum 30 back and forth at a second sinusoidally variable speed a plurality of times. The second sinusoidally variable speed may have an amplitude that is approximately one-half of the amplitude of the first sinusoidally variable speed. The first loft layer may be less dense than the second loft layer and more corrugated than the second loft layer. In some embodiments the skin layer and the first loft layer may have a plurality of fibers of a substantially common first average diameter and the second loft layer and the rigid fiber curl layer may have a plurality of fibers of a substantially common second average diameter. In some of those embodiments the first average diameter may be approximately 38 microns and in some of those embodiments the second average diameter may be approximately 28 microns.

The foregoing description has been presented for purposes of illustration. It is not intended to be exhaustive or to limit the invention to the precise forms disclosed, and obviously many modifications and variations are possible in light of the above teaching. It is understood that while certain forms of the invention have been illustrated and described, it is not limited thereto except insofar as such limitations are included in the following claims and allowable functional equivalents thereof.

We claim:

1. A method of forming a fiberglass mat, comprising the steps of:
   rotating a drum;
   feeding a molten fiberglass material through at least one orifice of a furnace while rotating said drum;
   altering the relative position of said orifice with respect to a location on said drum while rotating said drum and feeding said molten fiber-glass material through said orifice to build up a fiberglass mat along a traverse length;
   wherein during at least a portion of building up said fiberglass mat, said relative position of said orifice with respect to said location on said drum is moving at a variable speed in a first direction for less than said traverse length then moving at a substantially constant speed in a second direction for less than said traverse length a plurality of times;
   wherein said first direction is substantially opposite said second direction.

2. The method of forming a fiberglass mat of claim 1, wherein said drum is traversable along a drum traverse path substantially parallel with an axis of rotation of said drum.

3. The method of forming a fiberglass mat of claim 2, wherein said orifice is traversable along a furnace traverse path substantially parallel with said axis of rotation of said drum.

4. The method of forming a fiberglass mat of claim 1, wherein said substantially constant speed is at least three times greater than the maximum speed of said variable speed.

5. The method of forming a fiberglass mat of claim 1, wherein the distance of each said first direction movement is less than twenty-five percent of said traverse length.

6. The method of forming a fiberglass mat of claim 5, wherein the difference in distance between each said first direction movement and each said second direction movement is less than five percent of said traverse length.

7. The method of forming a fiberglass mat of claim 6, wherein said variable speed is sinusoidally variable.

8. A method of forming a fiberglass mat, comprising the steps of:
  rotating a drum;
  feeding a molten fiberglass material through at least one orifice of a furnace while rotating said drum;
  traversing one of said drum and said furnace back and forth along a traverse path such that a first end thereof moves between a first traverse location and a second traverse location while maintaining the other of said drum and said furnace in a substantially stationary position while rotating said drum and feeding said molten fiberglass material through said orifice to build up said fiberglass mat;
  wherein said traverse path is generally perpendicular to the rotation of said drum;
  wherein a plurality of traverses of said first end between said first traverse location and said second traverse location are fiber curl traverses;
  wherein during at least a portion of movement of said first end between said first traverse location and said second traverse location during said fiber curl traverses said first end is:
  moving along said traverse path in a first direction from a first location between said first traverse location and said second traverse location at a variable speed, said first location being more proximal said first traverse location than said second traverse location;
  stopping at a second location between said first traverse location and said second traverse location, said second location being more proximal to said second traverse location than said first location is to said second traverse location;
  moving along said traverse path in a second direction generally opposite said first direction at a substantially constant speed;
  stopping at a third location between said first traverse location and said second traverse location, said third location being more proximal to said first traverse location than said second location is to said first traverse location; and
  moving in said first direction at a variable speed.

9. The method of claim 8, wherein said third location is between said first location and said second location.

10. The method of claim 8, wherein said third location is between said first location and said first traverse location.

11. The method of claim 10, further comprising the step of stopping at a fourth location between said first traverse location and said second traverse location more proximal to said second traverse location than said third location is to said second traverse location.

12. The method of claim 11, wherein said fourth location is between said second location and said second traverse location.

13. The method of claim 12, wherein said first end of said drum is traversed back and forth along said traverse path between said first traverse location and said second traverse location while maintaining said furnace in a substantially stationary position.

14. A method of forming a fiberglass mat, comprising the steps of:
  rotating a drum;
  feeding a molten fiberglass material through at least one orifice of a furnace while rotating said drum;
  traversing one of said drum and said furnace back and forth along a traverse path such that a first end thereof moves between a first traverse location and a second traverse location while rotating said drum and feeding said molten fiber-glass material through said orifice to build up said fiberglass mat;
  wherein a plurality of traverses of said first end between said first traverse location and said second traverse location are fiber curl traverses; and
  wherein during a portion of movement of said first end between said first traverse location and said second traverse location during said fiber curl traverses the position of said first end is:
  moving at a first variable speed along said traverse path in a first direction from a first location between said first traverse location and said second traverse location, said first location being more proximal said first traverse location than said second traverse location;
  stopping at a second location between said first traverse location and said second traverse location, said second location being more proximal to said second traverse location than said first location is to said second traverse location;
  wherein the distance between said first location and said second location is less than twenty-five percent of the distance between said first traverse location and said second traverse location;
  moving along said traverse path in a second direction generally opposite said first direction at a substantially constant speed;
  stopping at a third location between said first traverse location and said second traverse location more proximal to said first traverse location than said second location is to said first traverse location;
  wherein the distance between said second location and said third location is less than twenty-five percent of the distance between said first traverse location and said second traverse location; and
  moving at said first variable speed in said first direction.

15. The method of claim 14, wherein said third location is between said first location and said first traverse location.

16. The method of claim 14, wherein the distance between said third location and said first location is less than five percent of the distance between said first traverse location and said second traverse location.

17. The method of claim 16, wherein said substantially constant speed is at least three times greater than the maximum speed of said variable speed.

18. The method of claim 14, wherein the distance between said third location and said first location is less than one percent of the distance between said first traverse location and said second traverse location.

* * * * *